Figures 1, 2:
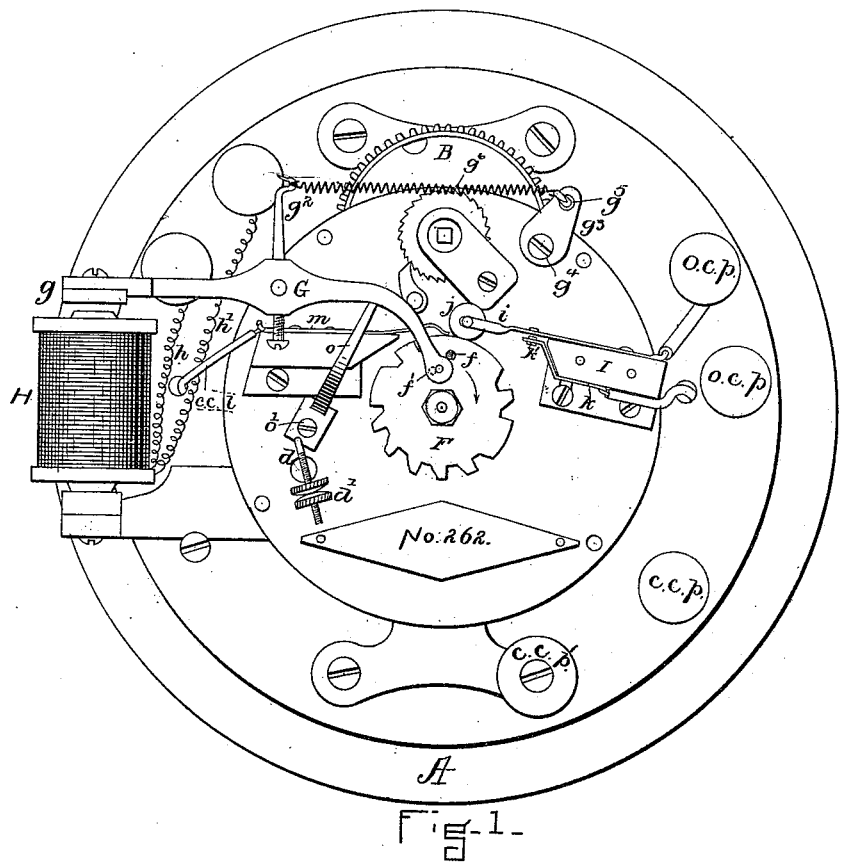

(No Model.)  5 Sheets—Sheet 1.

G. W. ADAMS.
ELECTRIC ALARM.

No. 447,998.  Patented Mar. 10, 1891.

WITNESSES
J. W. Dolan
James T. Ball

INVENTOR
Geo. W. Adams
by his attys
Clarke & Raymond (No Model.)
5 Sheets—Sheet 2.

G. W. ADAMS.
ELECTRIC ALARM.

No. 447,998.                     Patented Mar. 10, 1891.

WITNESSES.
J. M. Dolan
James T. Ball

INVENTOR
Geo. W. Adams
by his atty.
Charles A. Raymond (No Model.) 5 Sheets—Sheet 3.

G. W. ADAMS.
ELECTRIC ALARM.

No. 447,998. Patented Mar. 10, 1891.

WITNESSES
J. H. Dolan
James T. Ball

INVENTOR
Geo. W. Adams
by his atty—
Clarke & Raymond (No Model.)  5 Sheets—Sheet 4.

G. W. ADAMS.
ELECTRIC ALARM.

No. 447,998. Patented Mar. 10, 1891.

WITNESSES.
J. M. Dolan
James T. Ball.

INVENTOR
Geo. W. Adams
by his attys
Clarke & Raymond (No Model.)

G. W. ADAMS.
ELECTRIC ALARM.

No. 447,998. Patented Mar. 10, 1891.

WITNESSES
J. Ko. Dolan
W. H. Whitney.

INVENTOR
Geo. W. Adams
by Atty

UNITED STATES PATENT OFFICE.

GEORGE W. ADAMS, OF BOSTON, MASSACHUSETTS.

ELECTRIC ALARM.

SPECIFICATION forming part of Letters Patent No. 447,998, dated March 10, 1891.

Application filed June 6, 1890. Serial No. 354,508. (No model.)

*To all whom it may concern:*

Be it known that I, GEORGE W. ADAMS, of Boston, in the county of Suffolk and State of Massachusetts, a citizen of the United States, have invented a new and useful Improvement in Electric Alarms, of which the following is a full, clear, and exact description, reference being had to the accompanying drawings, forming a part of this specification, in explaining its nature.

The invention relates to a system of protection by automatic electric alarms, part of the apparatus of which is located in the building sought to be protected and part of the apparatus of which is located in a central office, the same being connected by electrical circuits to the apparatus in the building.

It consists of one or more circuits with switches, push-buttons, or automatic circuit-closers at the points liable to be attacked, of a battery located in the building to be protected, and an automatic circuit-breaker actuated by the local battery and local circuits as one part of the system of two independent circuits, one an open circuit and the other a closed circuit, connecting the buildings to be protected with the central office and of the central-office system, which consists of the ordinary receiving and indicating apparatus of an alarm system of two batteries, one for the open general circuit and one for the closed general circuit, and of a relay-battery and circuit operating in connection with the closed general circuit. In speaking of these different parts the circuit, the circuit-breaker, and the battery contained in the building to be protected will be designated as "localized," this word being selected instead of the word "local," because the word "local" has already a specific meaning in the telegraphic and telephonic art, and applies to some parts of the central-office system as well as to parts of the system which is in the buildings, and which is to be designated as "localized." The circuits and their batteries which connect the central office with the buildings to be protected are designated hereinafter as the "general circuits" and "batteries." The local circuit in the central office, which is operated by the relay, is called the "relay-circuit." As there need be no indicator except in the central office and no alarm-bell except in the central office, it will not be necessary to apply any particular form of words to these parts.

In the drawings like letters and numerals are used to indicate like parts in all the figures.

Figure 3:
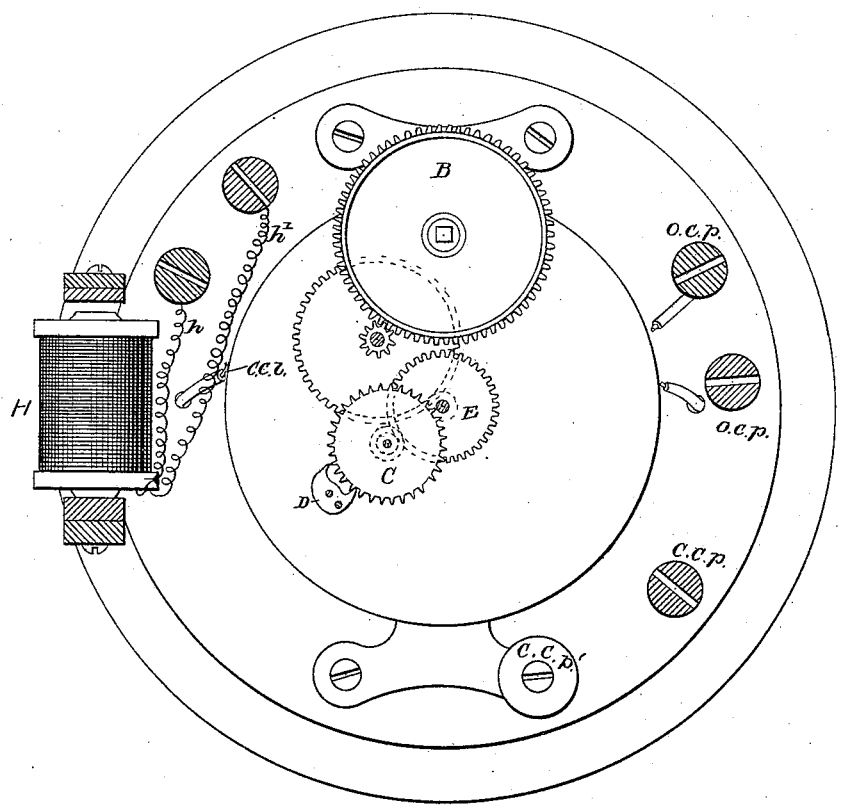
Figure 4:
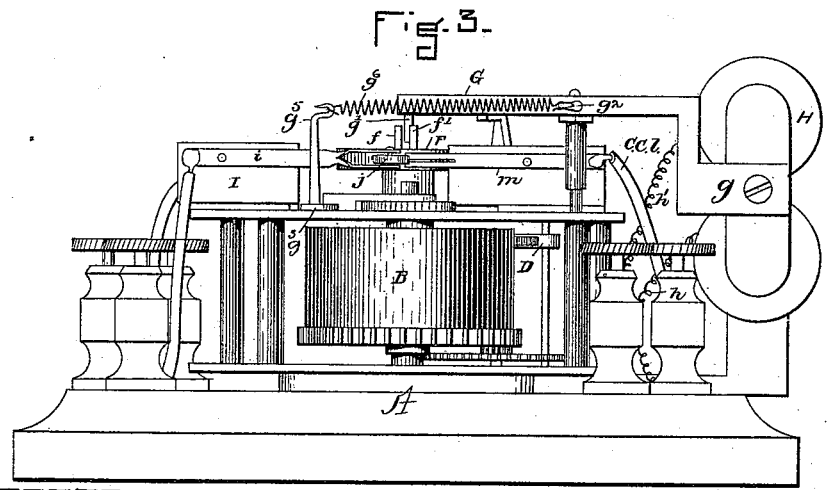
Figure 5:
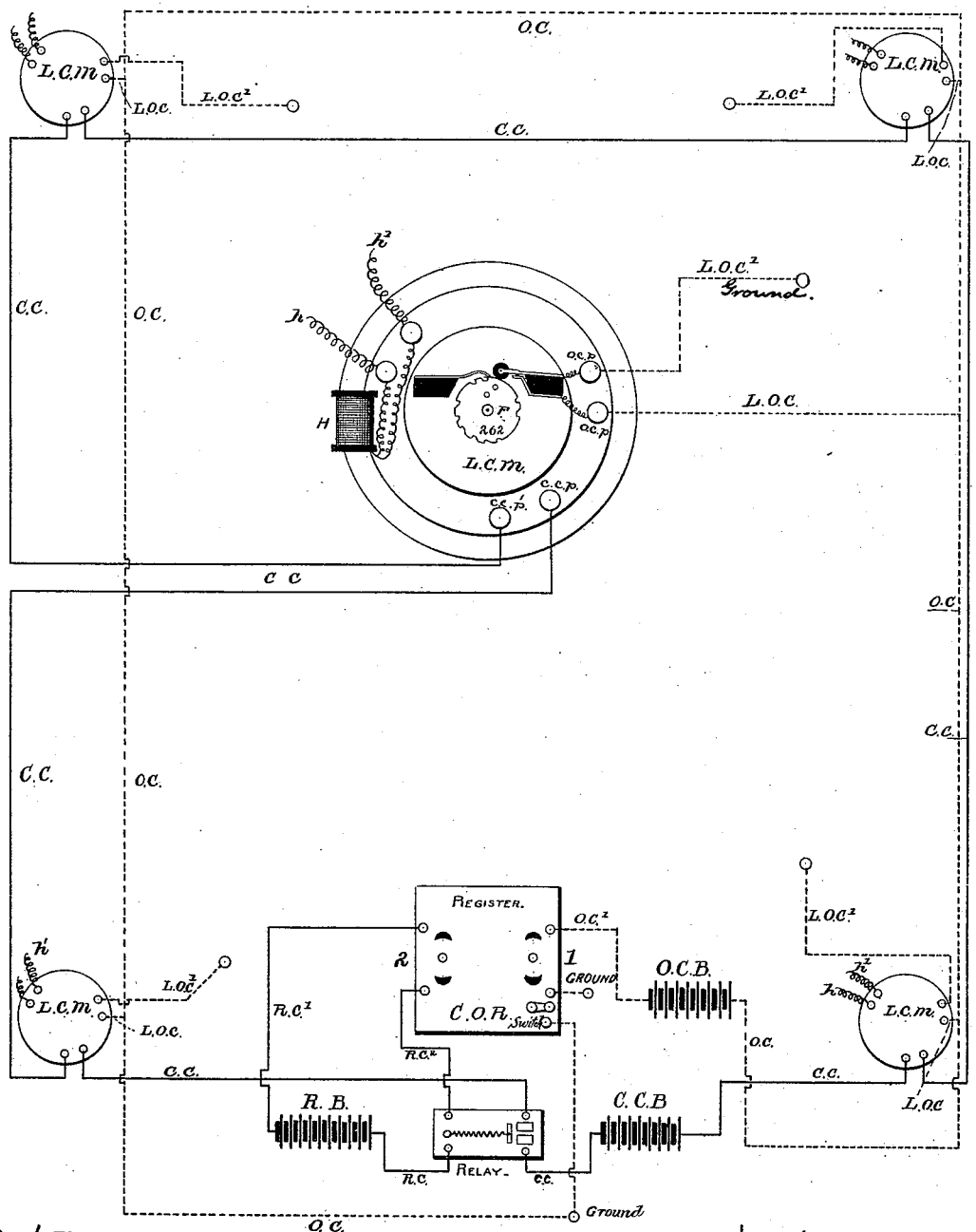
Figure 6:
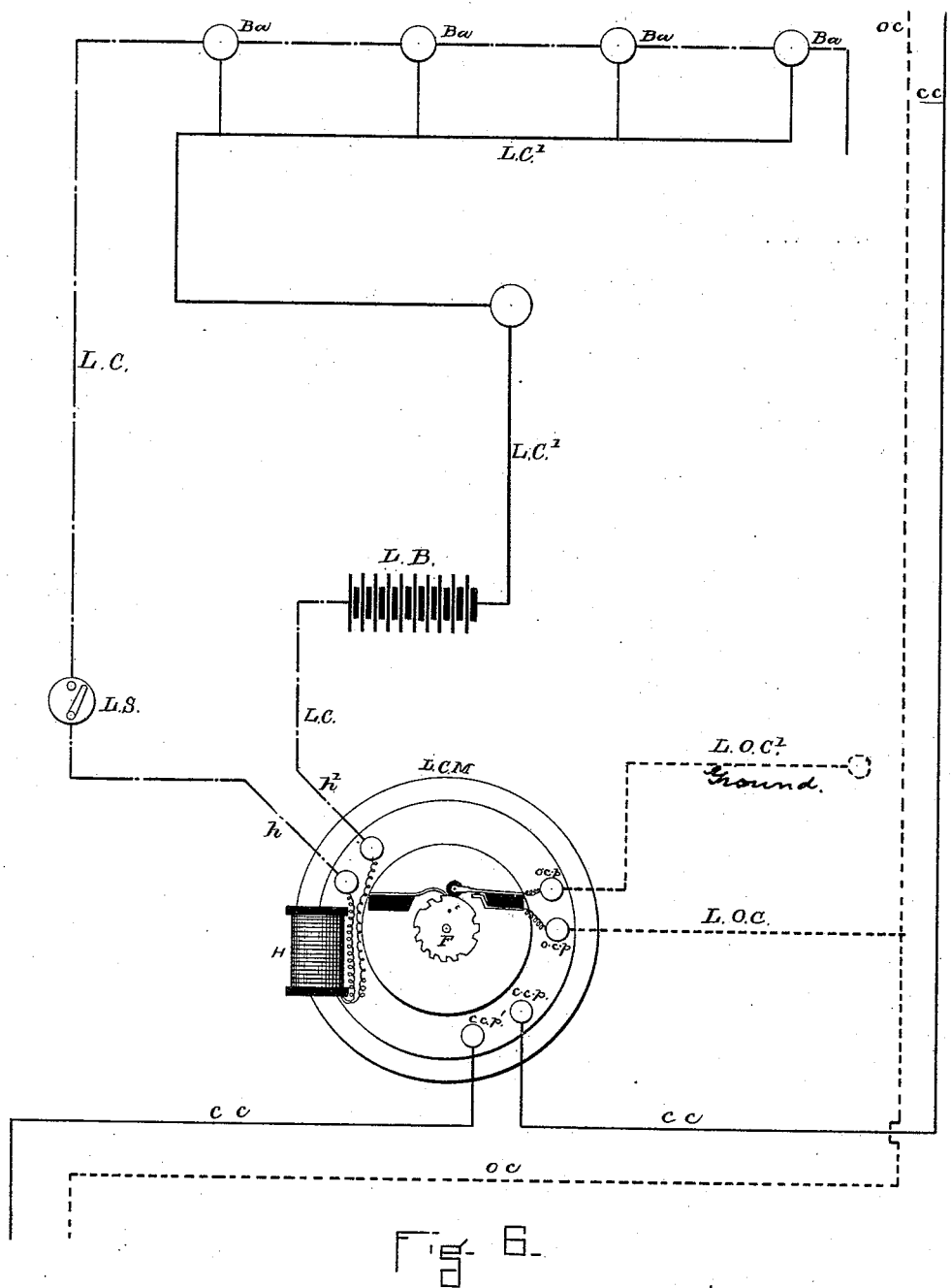
Figure 7:
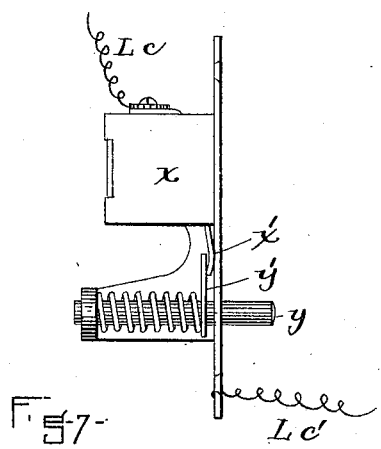
Figure 8:
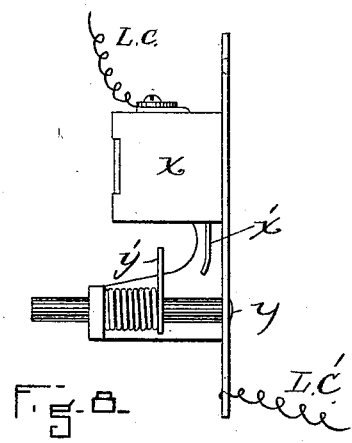

Figure 1 is a view in plan of the localized automatic circuit-breaker which sends out the alarm over the general circuits, and Fig. 2 is an elevation of the same machine. Fig. 3 is a transverse section showing the actuating parts of the machine, the top plate being removed; and Fig. 4 is an elevation of the machine from the opposite side to that shown in Fig. 2. Fig. 5 is a diagram of the whole system, showing the batteries, receiver, relays, the localized apparatus, except the batteries, and localized alarm system; and Fig. 6 is a diagram of the localized alarm system and its battery, showing the connection of the same with the general circuit system. Figs. 7 and 8 show the door attachment.

It will be convenient to explain the localized system first. In this L B is the battery. From one pole of this battery the localized circuit L C leads to the localized contact maker and breaker L C M. From the other pole the localized circuit L C' leads around the parts of the building to be protected, having at the openings at which burglaries may be expected, or at the places where it is proper to place thermostats, if such are used, contact-makers or push-buttons, to which branches from the wire L C' are respectively led. These contact-makers are marked in the drawings, Fig. 6, B a. They are connected with each other and with the localized contact maker and breaker L C M by the wire L C, as shown, and in this wire at some convenient point is placed a switch which is not automatic, but which is closed when the building is left to itself. One of these contact-makers B a may be placed somewhere near the street and at a height where it can be conveniently reached by the watchman going his rounds, it being protected, for instance, by a cover, which he has to unlock, or being contained in a lock of some sort, which he actuates by a key. Many of these sorts of contact-makers already exist.

It will next be convenient to consider Fig. 5, the diagram of the general system. In this general system it will be noticed there are two sets of lines representing the circuits, one marked O C, which are broken lines and which represent an open circuit, and the other marked C C, which are full lines and which represent the closed circuit. The open-circuit line is connected at one end with the open-circuit battery O C B and at the other end with the register C O R, on the side marked 1, to an appropriate binding-post. An ordinary annunciator and alarm is interposed between this connection and the connection of the wire O C', which leads from this register to the opposite pole of the battery O C B. Wires L O C lead from this open circuit to binding-posts in the machine L C M, which is the soul of the localized system, and connect the localized system with the general circuit system, and from another binding-post in the machine L C M, after passing through the machine in a way hereinafter to be described, a ground-wire L O C' leads from the said machine to the ground. In consequence of this arrangement, when contact is made on the open circuit L O C, a signal will be sent through the open circuit O C to the register C O R on the side marked 1. The closed circuit is marked on the diagram, Fig. 5, C C. It is led from one end of the closed-circuit battery C C B around the circuit, passing into each one of the machines L C M and out from it again, the connection being made as will hereinafter be described, the other end of the closed circuit C C terminating in the relay marked on the diagram "Relay." The armature of this relay is connected by the relay-circuit R C to one end of the relay-battery. The other end of the relay-battery is connected by the wire R C' with the register, and after passing through the register in the ordinary way for actuating it is again connected by the wire R C² with a binding-post of the relay. When, therefore, the closed circuit C C is broken in any one of the machines L C M, the armature of the relay is released and the circuit R C R C' R C², which is ordinarily an open circuit, is closed, and a signal sent over the circuit and through the register C O R on the side marked 2. This combination of an open and closed circuit for the general line is a combination of considerable importance. The two general circuits would not be run over the same poles to the different buildings, and interference with either circuit can be readily detected at the central office or at either one of the localized instruments by a suitable circuit-closer. In other words, either of the general circuits, the closed or the open one, may be tested from any alarm-station or the central office to see if it is intact.

The localized instrument L C M, which is the soul of the localized system, and indeed of the whole system, is represented in the figures of the drawings numbered from 1 to 4. In this A is the frame of the machine. B is the spring-drum, which serves to actuate the machine and which is connected by suitable wheel-work with a scape-wheel C. (Shown in Fig. 3.) This scape-wheel is caused to revolve with regularity and precision by the rocking of the pallet D. (Shown in Fig. 3 in plan and in Fig. 2 in side elevation.) On this pallet D, Fig. 3, near the lower end, appears a round dot, which is the place at which the horizontal pendulum $d'$ of Fig. 1 is attached to the pallet to keep the said horizontal pendulum in fixed relations with the pallet. The arbor of the second wheel E is continued through the top plate of the machine and carries on its upper end the break-wheel F. The edge of this break-wheel is cut into notches, and the first and last of these notches are separated from each other by a long cylindrical surface, on which the contact makers and breakers may rest when the machine is in repose. The wheel represented in Fig. 1 is supposed to revolve from left to right. The first notch of this wheel is therefore the notch on the left-hand side of the detent-arm G and partly concealed by it. This notch is separated from the next adjacent space by a comparatively short cylindrical surface and the second notch from the third by a comparatively long cylindrical surface shorter, however, than the cylindrical surface on which the contact makers and breakers rest when the machine is in repose. The edge of the wheel is then cut with six notches separated from each other by comparatively short cylindrical spaces. These notches are then followed by a comparatively long cylindrical surface, and this comparatively long cylindrical surface is followed by two notches separated from each other by a comparatively short cylindrical surface, which brings us round to the cylindrical surface on which the contact makers and breakers were resting at the beginning. It will be seen from this that if the contacts for each of the circuits are made and broken at each notch in the revolution of the wheel an alarm will be sent over each of the circuits which will indicate station "262," and by a change in this break-wheel it can readily be seen that a different alarm can be sent over the circuit for each different arrangement of notches, so that the precise locality sending in the alarm can readily be detected. Up from the surface of this break-wheel there project two pins $f$ and $f'$. A pin on the detent-arm G engages with these pins and serves to prevent the revolution of the wheel F when the detent-arm is in position. This detent-arm is pivoted, as shown in Fig. 1, so as to form a lever of the first order, and at the opposite end from that which engages the pins $f f'$ is an armature $g$, which is actuated by the electro-magnet H. This electro-magnet is connected by wires $h h'$ with binding-posts, to which are attached the wires of the localized circuit L C. (Shown in Fig. 6.) On closing the localized circuit L C at any of the stations B $a$ a current will be sent through the localized circuit which will excite the magnet H, attract the armature $g$, and trip the detent, and the break-wheel F will thereupon revolve. The open circuit O C of the general system is led into the machine over one of the posts O C $p$, and from the other of the posts O C $p$ there runs a ground-wire, which is marked on the diagram of Fig. 5 L O C'. It is quite immaterial from the construction of this machine to which of these two posts O C $p$ the ground-wire is attached. An insulating-block I is placed adjacent to these binding-posts O C $p$, and on each side of the block is run a metallic connection, one of which terminates in one of the binding-posts O C $p$ and the other of which terminates in the other of said binding-posts O C $p$. The metallic connection on the upper side marked $i$ carries on its end a truck $j$ of insulating material, and the arm $i$ is a spring-arm capable of a little rise and fall. The metallic connection on the other side of the insulating-block I is marked $k$ and is bent upward, so as to nearly approach the spring-arm $i$ when the latter is at its highest position. It terminates in a contact-point $k'$. It will be seen from this that when the truck $j$ rests upon the cylindrical surface of the break-wheel F between the notches the spring-arm $i$ will be slightly raised and removed from the contact-point $k'$. When, however, the truck $j$ drops into the notches of the break-wheel F, this spring-arm $i$ will come in contact with the contact-point $k'$ and a signal will be sent over the closed circuit C C to the central office. Two other binding-posts C C $p$ and C C $p'$ serve to connect the closed circuit C C with the machine. One of these binding-posts C C $p'$ is connected with the metallic frame-work of the machine and through this metallic frame-work and the arbors of the gearing with the body of the break-wheel F. The other of the posts C C $p$ is connected by a wire (not shown) with the wire $c$ $c$ $l$ and through that with the contact-spring $m$, one end of which usually rests on the cylindrical surface of the break-wheel F. This spring is curved downward at its end in such a way as to form a tooth, which tooth is so shaped and proportioned with regard to the notches of the wheel that when it slips off of the edge of one of the notches in the revolution of the wheel it does not strike the opposite side of the notch until a short interval has intervened, during which the wheel is revolved a short distance. Hence the circuit will be interrupted at each notch. The points at which the wheel $j$ and the tooth on the end of the spring $m$ rest upon the break-wheel F are adjacent to each other, and hence the alarm sent will be almost but not quite simultaneous.

In order to regulate the speed of revolution of the break-wheel, the arbor of the pallet D is carried through the top plate of the machine, as shown in Fig. 2 at $d$, and terminates in a cross-bar, on which is mounted the weight $d'$, which may be moved in or out on said cross-bar, and thereby vary the speed at which the pallet D vibrates.

The engagement between the detent and the break-wheel in this machine requires to be quite delicate. The detent-arm G is provided at its end with a laterally-projecting pin. (Best shown in the drawings, Fig. 2, at $g'$.) Two pins $f$ and $f'$ are inserted in the face of the wheel F, as shown in Fig. 2 and also in plan in Fig. 1. The detent G when it falls is so arranged as to bring the small pin $g'$ directly in front of the small pin $f'$ in the face of the wheel F; but as these parts are delicate there might be danger of rebound, or it might be possible that the armature $g$ should adhere from an electric current still passing or from residual magnetism or other cause. In order to secure, therefore, a definite stop of the break-wheel when it has completed its circle, the pin $f$ is provided in the face of the break-wheel. If the armature $g$ is attracted, the pin $f$ in the break-wheel F will catch the pin $g'$ on the end of the detent G and stop the machine. This cannot be started again till the armature has been released. If the armature is retracted instead of attracted, the pin $g'$ catches the pin $f'$ in the wheel F and holds the wheel from revolving. After the machine has stopped, on the engagement of pin $f$ in the wheel F and pin $g'$ in the detent, and the armature is thereupon released, the detent has time to move and make the pin $g'$ engage with the pin $f'$ before the wheel F has revolved far enough to carry the pin $f'$ past the path of the detent-pin $g'$. This automatically restores the two general circuits to their original condition, and no alarm can be sent over either of them until the armature is again actuated by the closing at some point of one of the alarm-stations B $a$ of the localized circuit system. In order to nicely balance the detent-arm G, a standard $g^2$ is erected immediately over its pivotal point and terminated upward with a hook. An ear $g^3$ is applied to the top plate of the machine a short distance away, and this ear may be turned around on the pivot which attaches it to the frame of the machine, and which, being a screw, is adapted to clamp this ear $g^3$ in almost any radial direction around its center of motion, which will be, of course, the shank of the screw $g^4$. On the outer end of this ear is erected a post $g^5$, which carries at its top a hook, as shown in Fig. 2. A delicate tension-spring $g^6$ extends from one of these hooks to the other, and greater or less tension can be put upon this spring $g^6$ by turning the ear $g^3$ more or less around its pivotal connection $g^4$, and when the proper tension has been given to said spring the ear $g^3$ is clamped in the required position. This tension-spring allows the force with which the detent-arm G is thrown down to be very delicately adjusted to the requirements of service. It might be possible, however, for the detent-arm G to be thrown down a little too far, and so remove the armature too great a distance from the poles of the magnet, (lettered H.) To prevent this, a stop *o* is provided, against the end of which the detent-arm G impinges in its descent, which stop prevents the detent-arm from descending too low. This stop is pivoted as shown at *o'*, and as the curvature of the side of the detent-arm G adjacent to the stop *o* does not coincide with the radius of a circle struck from the center of the pivotal connection *o'*, but is a curve which is struck from a different center, or which is not a true tangent to the circle on which the end of the stop *o* moves, it is clear that by rotating the stop *o* around its pivot at *o'* the inclination which the detent-arm G will assume and the distance which the armature *g* will recede from the magnet H can be regulated with great delicacy, and the engagement of the three pins *f, f'*, and *g'* can be securely effected according to the requirements of service.

The employment of an apparatus of this construction enables me to employ only one machine in a building to be protected, while I use two general circuit systems for conveying intelligence from the interior of the building to the central office. It also enables me to secure at the central office a pretty thorough supervision of the watchmen who are making patrol through the protected district cared for by this system of burglar and fire alarm. It also enables one to detect readily any attempted tampering with the line-wire of the general circuit system.

Systems of this sort, whether automatically actuated by thermostats or simply actuated by switches connected with the openings of the buildings, which is the usual way of actuating a burglar-alarm system, are of late years known as "electric protective systems," and this phrase will be adopted for brevity in the claims.

On reference to the diagram of Fig. 6 the switch L S will be noticed. In an ordinary business day the apertures of a building which are protected by the localized circuit, at which apertures the alarm-stations B *a* are situated, are liable to be in a condition to send an alarm over the localized circuit; but this of course would be undesirable. Consequently the switch is turned so as to disconnect the localized circuit and economize in the consumption of the battery belonging to it. When, however, the building to be protected is closed for the night or for a holiday, the manager of the building connects the localized circuit by moving the switch. After the manager of the building has connected the localized circuit by moving the switch, if one of the apertures of the building is unprotected an alarm will be sounded and he will know that the building is not properly shut up; but if the building is properly shut up, including the door through which he is to pass in order to leave the building, then through the door of the building, which in all instances is one of the apertures protected by an alarm-station B *a*. One of these door attachments is shown in Figs. 7 and 8. In this *x* is an insulating-block and *y* is a spring-bolt. L C and L C' are the wires of the local circuit. The wire L C connects with a spring *x'*, which is one of the contact-makers, and the wire L C' connects with the spring-bolt *y* through the metallic plate on which is mounted the apparatus. It will be seen that if this apparatus is sunk in a door or door-frame very much in the manner of a lock on closing the door the spring-bolt *y* is forced into the position shown in Fig. 8, the contact-points *x'*, attached to the wire L C and *y'*, connected with the wire L C', will be separated and no current will pass; but if the pressure on the end of the bolt *y* is removed the springs *x' y'* will come together and an electric current will pass.

This apparatus is a common burglar-alarm fixture, and the principle of it is adapted in many burglar-alarm fixtures. Such an apparatus as this is, is the sort of apparatus called elsewhere in the specification "the alarm-station B *a*." In passing through this he necessarily closes the localized circuit and sends a signal over the general circuits to the central office. This gives the central office notice of his departure. One of the central-office staff can then be sent out to test the condition of the protective or localized circuit by actuating that one of the stations B *a*, which is placed conveniently to be reached from the outside of the building. If this testing-signal comes into the office, the condition of the localized circuit will be satisfactory and the condition of the line-wires will be ascertained, and also it will be determined whether any of the parts of the building protected by the stations B *a* are properly protected or not, because no signal could be sent over the line-wires if either of the stations B *a* was part of a closed circuit. The central-office inspector may have his own special signal. As, for instance, he may notify his presence as distinguished from the presence of an attacking party, burglar or otherwise, by sending in two successive alarms, or indeed three, while only one alarm could be sent if the apertures to be protected in the building were so insufficiently guarded that they made a contact and were sending a continuous current over the magnet H. This fact results from the adoption of the system of double stops in the machine, which has been already described. In case it should be found that some one or more apertures in the building to be protected had been insufficiently attended to it is obvious that a guard could readily be set upon the building and notice of the trouble at once sent to the proprietor that he might take such action as he should deem expedient.

I claim as my invention and desire to secure by Letters Patent of the United States—

1. In an electrical protective system, the simultaneous combination of two independent circuits, one open O C and one closed C C, with one and same break-wheel F, the revolution of which is adapted to simultaneously close the open circuit and break the closed circuit by means of the insulating-trolley $j$, the springing-arm $i$, and the contact-point $k$ for the open circuit and the springing-arm $m$ for the closed circuit, substantially as and for the purpose described.

2. In the automatic contact-maker of an electrical protective apparatus, the break-wheel F′ carrying the pins $f$ and $f'$ upon the face thereof, in combination with the detent G′, one end of which is provided with the armature $g$ and the other end of which is provided with the pin $g'$, adapted to be engaged with the pin $f'$ of the break-wheel F when the armature is up and with the pin $f$ when the armature is down, said pins $f$ and $f'$ being located on the face of the break-wheel F at different radial distances from its center and upon radial lines at an angle with each other and within that segment of the break-wheel which places the contact maker and breaker in normal relations with the general circuits, substantially as described.

3. The combination of the detent G, adjustable ear $g^3$, posts $g^2$ $g^5$, spring $g^6$, and break-wheel F, substantially as and for the purposes described.

4. In an electric protective apparatus, the combination of the localized alarm-circuit L C, provided with alarm stations B $a$, and with an electric contact maker and breaker L C M, containing a break-wheel F, carrying two pins $f f'$, arranged upon its face, as described, and with a detent G, adapted to engage with said pins $f f'$, as described, and with two general circuits, one closed C C and one open O C, each of which is connected with other localized alarm-circuits and other contact makers and breakers of the same description, said general circuits being simultaneously employed for the sending of signals of different electrical character to one and the same central office from the building in which a localized apparatus is situated, and with two alarms located in said central office, substantially as described.

GEO. W. ADAMS.

Witnesses:
THOS. WM. CLARKE,
F. F. RAYMOND, 2d.